(12) United States Patent
Chao et al.

(10) Patent No.: US 7,447,014 B2
(45) Date of Patent: Nov. 4, 2008

(54) BRACKET ASSEMBLY FOR DISK DRIVE AND A METHOD OF ASSEMBLING A BRACKET TO AN ENCLOSURE FOR PREVENTING RESONANCE

(75) Inventors: Chih-Hang Chao, Tu-Cheng (TW); Yu-Hsu Lin, San Jose, CA (US); Jeng-Da Wu, Tu-Cheng (TW); Zhi-Ping Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 90 days.

(21) Appl. No.: 11/309,778

(22) Filed: Sep. 23, 2006

(65) Prior Publication Data

US 2008/0074836 A1   Mar. 27, 2008

(51) Int. Cl.
H05K 7/00 (2006.01)

(52) U.S. Cl. .................. 361/685; 439/541.5; 312/223.2

(58) Field of Classification Search .............. 439/541.5; 312/223.1–223.6; 361/679–687, 724–727
See application file for complete search history.

(56) References Cited

U.S. PATENT DOCUMENTS

| 6,956,737 | B2 * | 10/2005 | Chen et al. | 361/685 |
| 2003/0095377 | A1 * | 5/2003 | Goodman et al. | 361/685 |
| 2006/0034048 | A1 * | 2/2006 | Xu | 361/685 |

* cited by examiner

Primary Examiner—Hung V Duong
(74) Attorney, Agent, or Firm—Wei Te Chung

(57) ABSTRACT

A bracket assembly for receiving at least one disk drive (40) includes an enclosure (10), a retaining bracket (30), and a connecting structure (312). The retaining bracket includes a pair of sidewalls (31, 32). The retaining bracket is attached to the enclosure at an edge of each sidewall. The connecting structure is defined in a first sidewall (31) of the sidewalls for attaching the first sidewall to the enclosure for altering a fixing relationship between the retaining bracket and the enclosure. The connecting structure is positioned near the disk drive, and away from the edge of the first sidewall. The method of assembling the bracket (30) to the enclosure (10) is also provided.

15 Claims, 4 Drawing Sheets

BRACKET ASSEMBLY FOR DISK DRIVE AND A METHOD OF ASSEMBLING A BRACKET TO AN ENCLOSURE FOR PREVENTING RESONANCE

FIELD OF THE INVENTION

The present invention relates to a bracket assembly and a method of assembling a bracket to an enclosure, more particularly to a bracket assembly for a disk drive and a method which is used for preventing resonance generated by the bracket and the disk drive, thereby reducing noise produced therefrom.

DESCRIPTION OF RELATED ART

During operation, a computer system may suffer shock and vibration. Some components, such as disk drives, may be damaged or destroyed by shock and vibration. Most disk drives have read/write heads mounted on the ends of lightweight arms. The heads are positioned adjacent to the surface of the disk. Shock or vibration of the disk drive housing may cause one of the heads to contact the surface of the disk. Such contact may cause permanent and irreparable damage to the disk. Even minor shock and vibration to a disk drive over a period of time may cause deficiencies in disk drive performance. The performance deficiencies may include difficulty and slowness of data access. A shock to a computer system may result in the generation of vibration of the exterior of the computer system. The vibration may be transmitted throughout the computer system.

A computer system may be subjected to vibration from an external source or an internal source. If the frequency of the vibration is close to the resonant frequency of structures within the computer system, the vibration energy transmitted throughout the computer system may increase. Such an effect is often referred to as "vibration resonance amplification." Vibration resonance amplification may result in the generation of noise from a computer system. Vibration resonance amplification may also damage components within a system. Noise and component damage may be caused by coupling vibratory components to the exterior of a computer system even without any resonance effects.

What is needed, therefore, is a bracket assembly for a disk drive which can effectively prevent resonance of the bracket and the disk drive, thereby reducing noise.

SUMMARY OF THE INVENTION

A bracket assembly for receiving at least one disk drive includes an enclosure, a retaining bracket, and a connecting structure. The retaining bracket includes a pair of sidewalls. The retaining bracket is attached to the enclosure at an edge of each sidewall. The connecting structure is defined in a first sidewall of the sidewalls for attaching the first sidewall to the enclosure for altering a fixing relationship between the retaining bracket and the enclosure. The connecting structure is positioned near the disk drive, and away from the edge of the first sidewall. A method for attaching a bracket to an enclosure for preventing resonance is provided. The method includes the following steps: attaching the bracket to the enclosure at an outer edge thereof, the bracket including a pair of parallel sidewalls; attaching at least one disk drive into the bracket; defining a connecting structure in a first sidewall of the sidewalls near the disk drive, the connecting structure positioned away from the outer edge of the first sidewall; and attaching the connecting structure to the enclosure.

Other advantages and novel features will be drawn from the following detailed description of a preferred embodiment with attached drawings, in which:

DETAILED DESCRIPTION OF THE INVENTION

Figure 1:
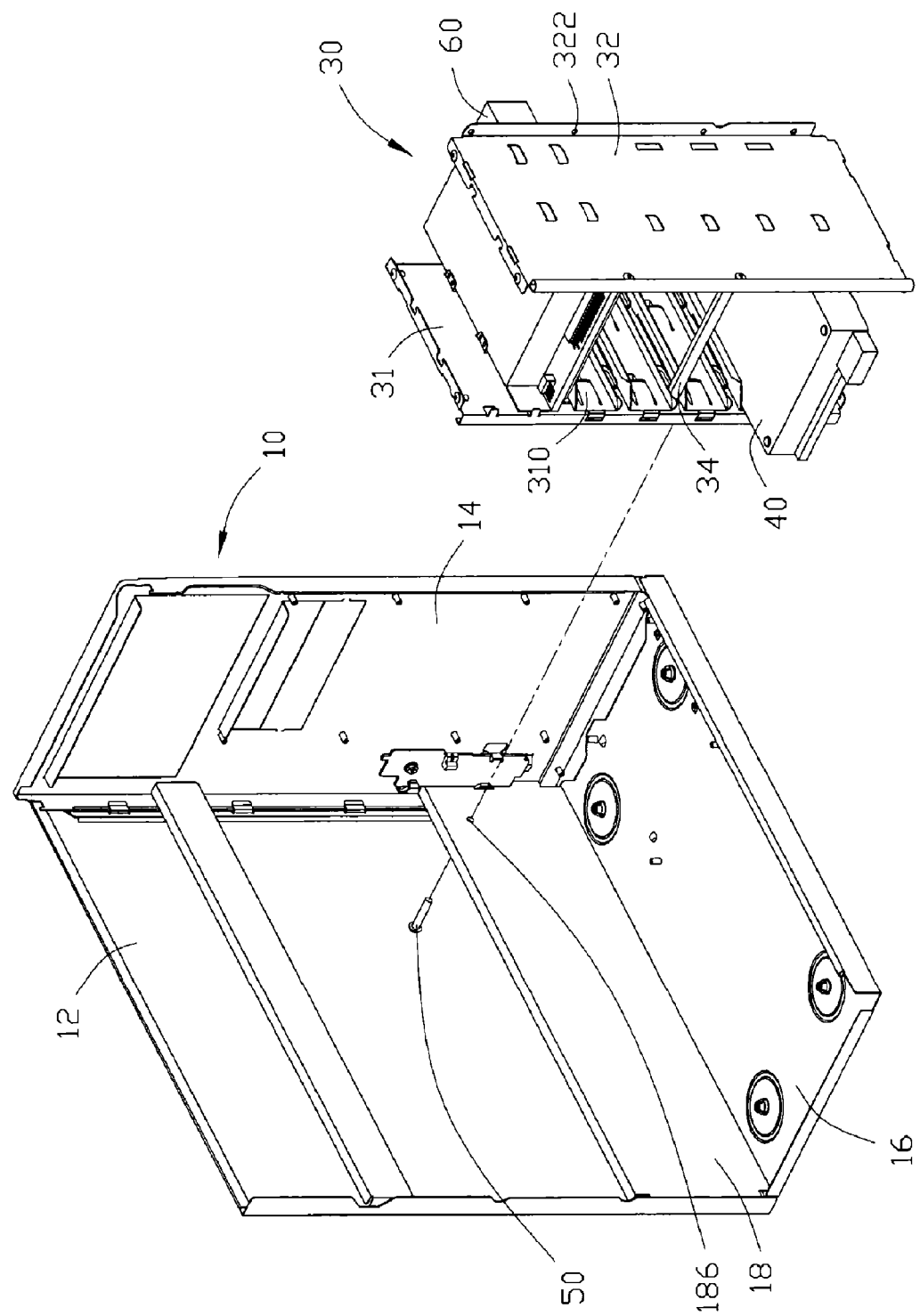
FIG. 1 is an exploded, isometric view of a bracket assembly for disk drives of a preferred embodiment of the present invention, the assembly including a computer enclosure, a retaining bracket, a connecting member, and a plurality of disk drives.

Referring to FIG. 1, a bracket assembly including a computer enclosure 10, a retaining bracket 30, a connecting member 50, and a plurality of disk drives attached to the retaining bracket 30 is shown.

The computer enclosure 10 includes a front panel 14, a side panel 12 perpendicularly attached to the front panel 14, and a bottom panel 16. A plate 18 is mounted to the front panel 14, positioned parallel to the side panel 12.

Figure 2:
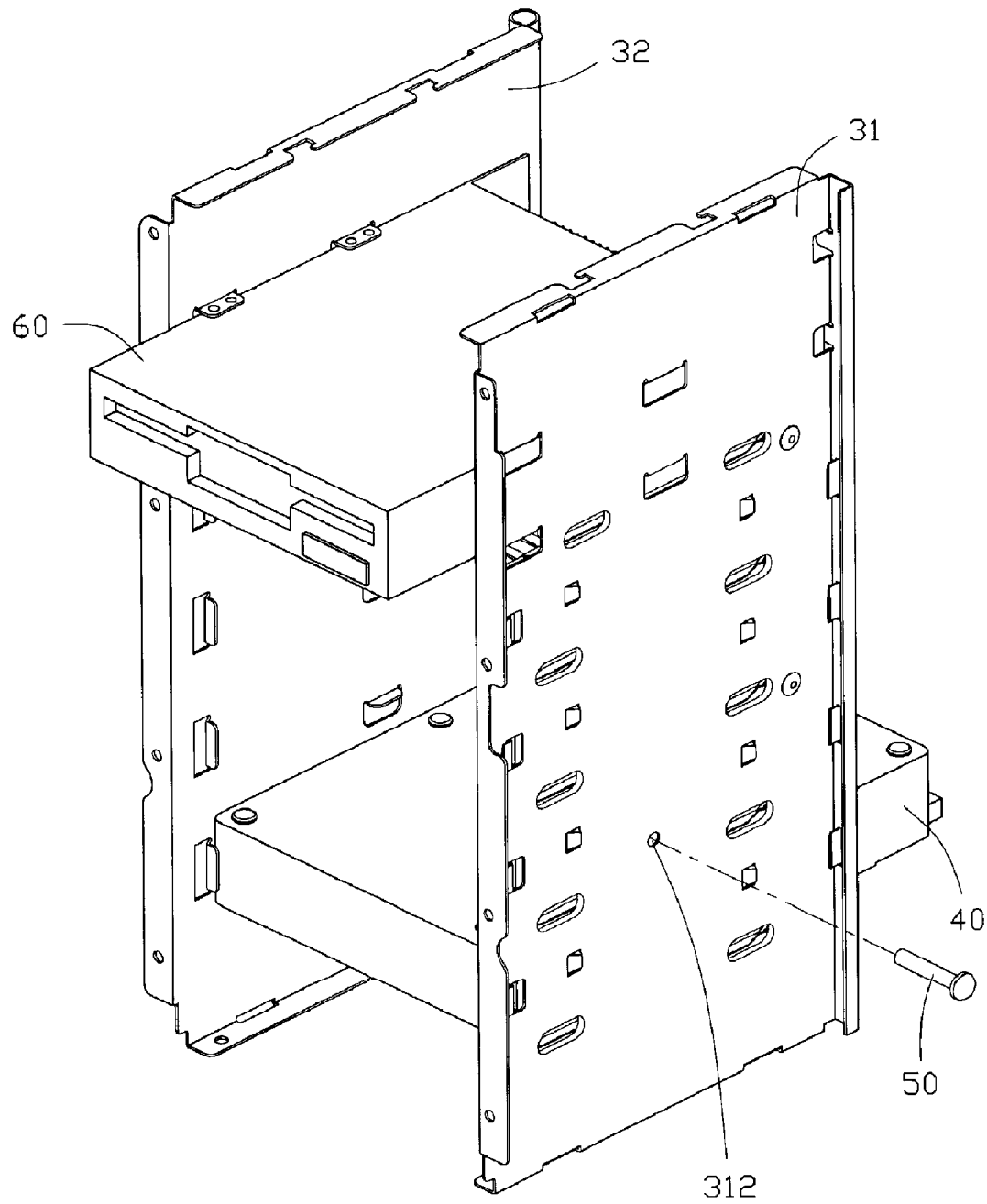
FIG. 2 is an enlarged, isometric view of the assembly of the retaining bracket and the disk drives of FIG. 1, but viewed from another aspect.

Referring also to FIG. 2, The retaining bracket 30 is symmetrically balanced and includes a pair of parallel sidewalls 31, 32. Each of the sidewalls 31, 32 has a flange at a front side thereof. A plurality of screw holes 322 is defined therein. A plurality of transoms 34 is formed between the two sidewalls 31, 32. A plurality of slideways is formed on an inside surface of each sidewall 31, 32 for guiding the disk drives into the bracket 30. The disk drives include a hard disk drive 40, a floppy disk drive 60, and other disk drives, as needed or desired to be used in the computer system. In the embodiment of the invention the hard disk drive 40 is working at 7200-rpm (revolutions per minute).

Figure 3:
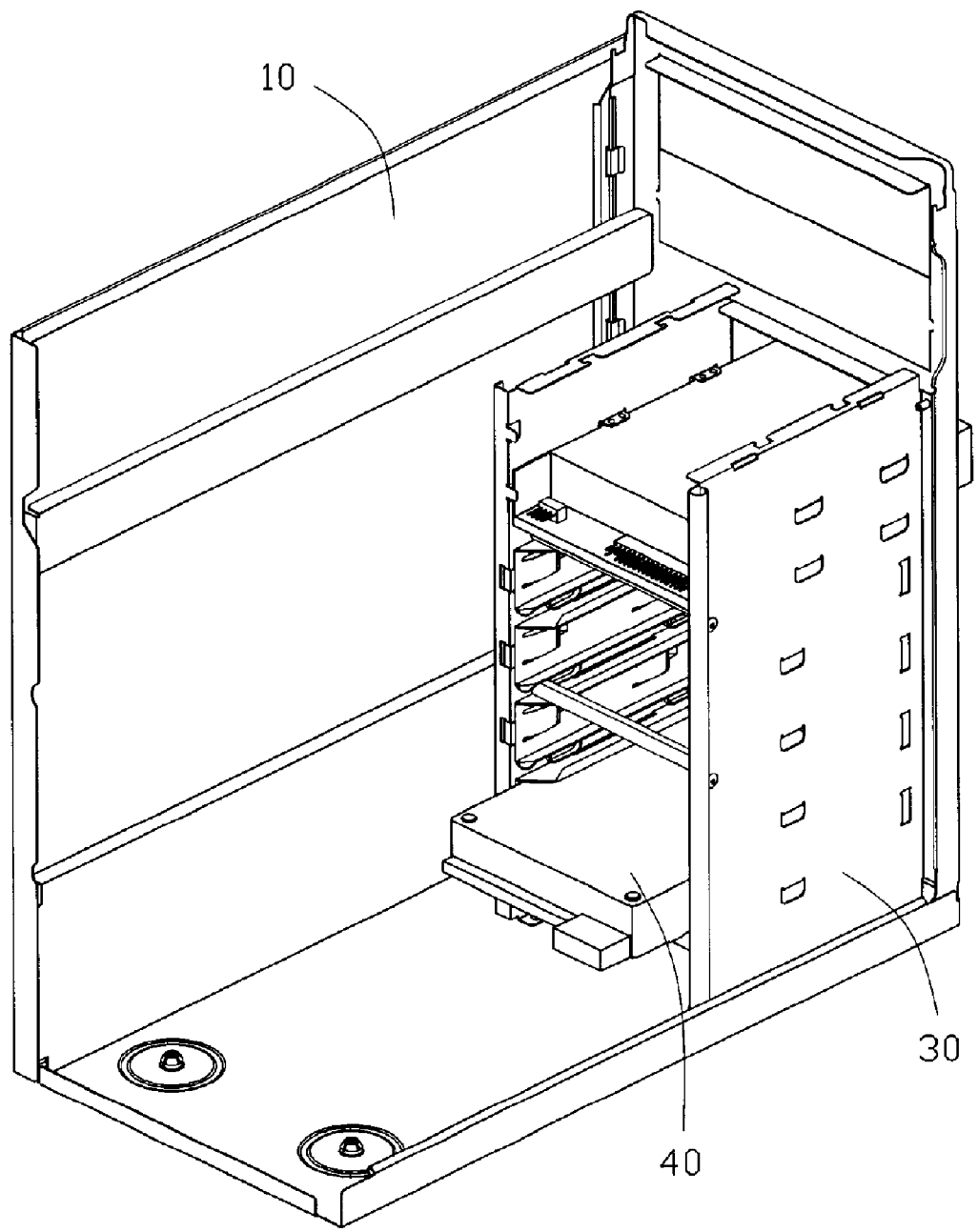
FIG. 3 is an assembled view of FIG. 1.

Referring also to FIG. 3, in assembling the retaining bracket 30 to the computer enclosure 10, a plurality of screws is provided to secure the retaining bracket 30 to the front panel 14 through the securing holes 322 of the retaining bracket 30. The hard disk drive 40 and the floppy disk drive 60 are respectively slid into one of the slideways of the retaining bracket 30, and secured therein.

Figure 4:
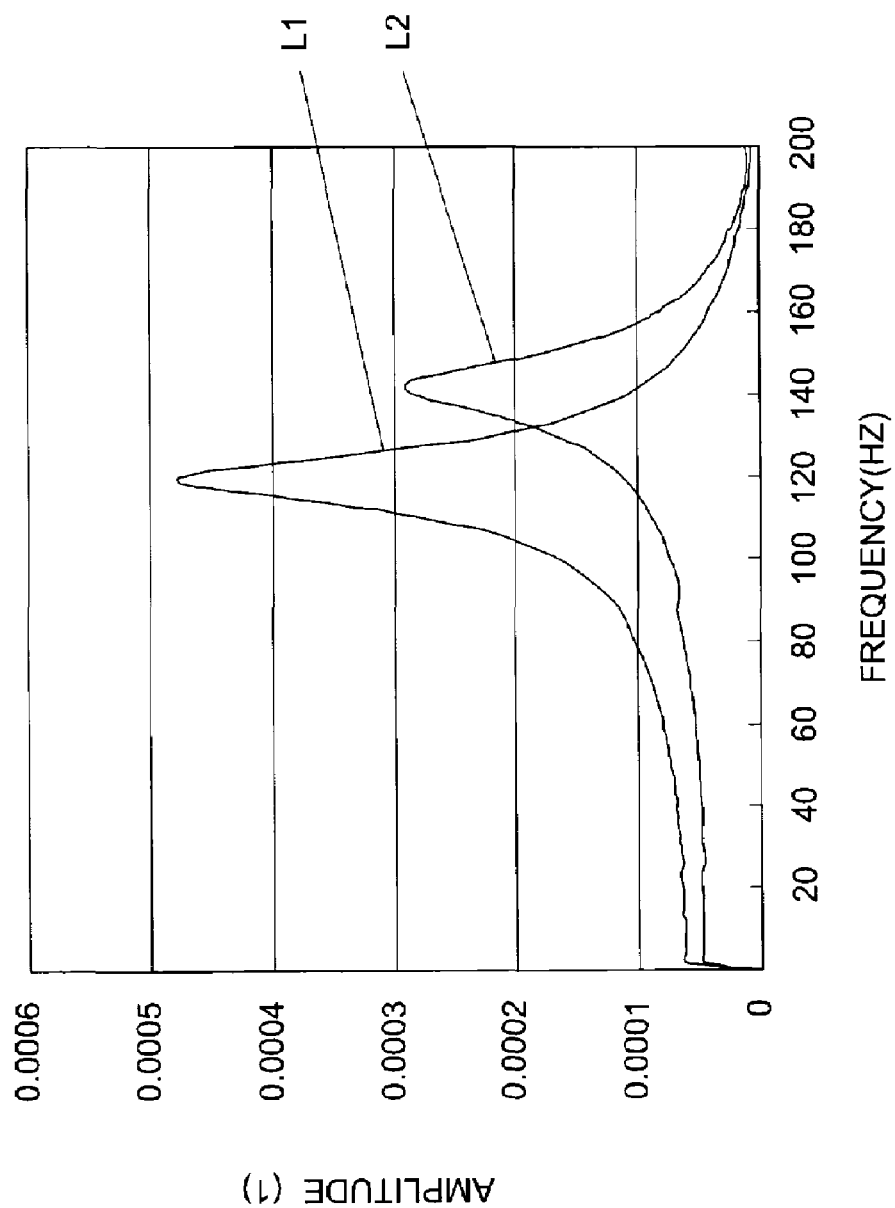
FIG. 4 is a graph of natural frequency and amplitude of the retaining bracket with/without the connecting member being mounted thereto.

A computer system with the bracket assembly assembled therein is provided. When the computer system is powered on, the rotating speed of the disc in the hard disk 40 works at 7200-rpm. It generates an invariable vibrating frequency. The vibrating frequency is about 120 Hz. The natural frequency of the retaining bracket 30 of the preferred embodiment of the present invention was found to be about 119.99 Hz (L1 in FIG. 4). The natural frequency of the retaining bracket 30 is close to the vibrating frequency of the hard disk 40. Thus, a resonance between the retaining bracket and the hard disk 40 is generated. The vibrating amplitude and noise of the retaining bracket 30 are increased. This vibration may damage the hard disk 40 and other components in the computer system. The noise may pollute exterior environment.

A method is provided to reduce the incidence of the resonance between the retaining bracket 30 and the hard disk 40. A connecting member 50, such as a rivet or screw, is used for connecting one of the sidewalls 31, 32 of the retaining bracket 30 to the computer enclosure 10 to alter a fixing relationship of the retaining bracket 30 with the computer enclosure 10, so that the natural frequency of the retaining bracket 30 is changed to avoid resonating with the hard disk 40. In the preferred embodiment of the present invention the connecting member 50 connects to the first sidewall 31 of the retaining bracket 30 to the enclosure 10. A connecting structure such as a through hole 312 is defined in the sidewall 31. The retaining bracket 40 is further attached to the computer enclosure 10 by passing the connecting member 50 fastening through the through hole 312 and a locking hole 186 of the plate 18. The through hole 312 is defined generally in a middle portion of the sidewall 31 near to the hard disk 40. With the connecting member 50 in place thus fixing the sidewall 31 to the computer enclosure 10. The natural frequency of the retaining bracket 30 was found to be approximately 142.77 Hz (L2 in FIG. 4). With the natural frequency of the retaining bracket 30 now far different from the vibrating frequency of the hard disk 40, resonance between the retaining bracket 30 and the hard disk 40 is effectively reduced or eliminated.

It is to be understood, however, that even though numerous characteristics and advantages have been set forth in the foregoing description of a preferred embodiment, together with details of the structure and function of the preferred embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A bracket assembly for receiving at least one disk drive, comprising:
   an enclosure;
   a retaining bracket, comprising a pair of sidewalls, the retaining bracket attaching to the enclosure at an edge of each sidewall; and
   a connecting structure defined in a first sidewall of the sidewalls for attaching the first sidewall to the enclosure for altering a fixing relationship between the retaining bracket and the enclosure, the connecting structure positioned near the disk drive, and away from the edge of the first sidewall, wherein a plate is set in the enclosure, and the connecting structure is attached thereto.

2. The bracket assembly as described in claim 1, wherein a connecting member is provided for connecting the first sidewall to the enclosure through the connecting structure.

3. The bracket assembly as described in claim 1, wherein a plurality of transoms is formed between the two sidewalls.

4. The bracket assembly as described in claim 1, wherein a plurality of slideways is formed in an inner surface of each sidewall of the retaining bracket for receiving the disk drive.

5. The bracket assembly as described in claim 1, wherein a plurality of holes is defined in a front edge of each sidewall for engaging with a front panel of the enclosure.

6. A method for attaching a bracket to an enclosure for preventing resonance, the method comprising the steps of:
   attaching the bracket to the enclosure at an outer edge thereof; the bracket comprising a pair of parallel sidewalls;
   attaching at least one disk drive into the bracket, the at least one disk drive entering into the bracket along a direction perpendicular to the outer edge;
   defining a connecting structure in a first sidewall of the sidewalls near the disk drive, and the connecting structure positioned away from the outer edge of the first sidewall; and
   attaching the connecting structure to the enclosure.

7. The method of claim 6, wherein the step of attaching the connecting structure to the enclosure is a step of attaching the connecting structure to a plate set inside the enclosure, the plate being parallel to the sidewalls.

8. The method of claim 6, wherein the step of attaching the connecting structure to the enclosure comprising a step of attaching a connecting member through the connecting structure and the enclosure.

9. The method of claim 6, wherein the step of attaching at least one disk drive into the bracket comprising a step of sliding the at least one disk drive along a slideway which is defined inside the bracket.

10. The method of claim 6, wherein the step of attaching the bracket to the enclosure at an outer edge thereof comprises screwing a front edge of each sidewall to a front panel of the enclosure through a plurality of holes defined in each front edge.

11. A bracket assembly, comprising:
    an enclosure comprising a plate;
    a retaining bracket, comprising a pair of sidewalk, the retaining bracket being attached to the enclosure at an edge of each sidewall;
    a disk drive received in the retaining bracket between the pair of sidewalls; and
    a connecting structure formed at only one of the sidewalls and engaging with the plate of the enclosure for breaking a symmetrical balance of a fixing relationship between the two sidewalls of the retaining bracket and the enclosure thereby changing a natural frequency of the retaining bracket, the connecting structure positioned near the disk drive while away from the edge of said one of the sidewalls.

12. The bracket assembly as claimed in claim 11, wherein a connecting member extends through the plate to engage with the connecting structure.

13. The bracket assembly as claimed in claim 12, wherein the connecting structure is a through hole.

14. The bracket assembly as claimed in claim 12, wherein the connecting structure is defined nearly in the latitude middle of said one of the sidewalls.

15. The bracket assembly as claimed in claim 11, wherein the enclosure comprises a front panel and a side panel, the sidewalls of the retaining bracket being attached to the front panel, the plate being attached to the front panel and positioned at an inside of the side panel parallel to the sidewalls, and spaced from the side panel.

* * * * *